(12) United States Patent
Soga et al.

(10) Patent No.: US 6,913,484 B2
(45) Date of Patent: Jul. 5, 2005

(54) COVERS FOR INSULATED PORTIONS IN AUTOMOTIVE ROOM LAMPS

(75) Inventors: Hisashi Soga, Saitama (JP); Kouichi Sinzawa, Saitama (JP)

(73) Assignee: Daiichi Denso Buhin Kabushiki Kaisha, Kawagoe (JP)

( * ) Notice: Subject to any disclaimer, the term of this patent is extended or adjusted under 35 U.S.C. 154(b) by 32 days.

(21) Appl. No.: 10/434,095

(22) Filed: May 9, 2003

(65) Prior Publication Data

US 2003/0214814 A1 Nov. 20, 2003

(30) Foreign Application Priority Data

May 14, 2002 (JP) ....................................... 2002-138449

(51) Int. Cl.[7] .............................................. H01R 27/00
(52) U.S. Cl. ...................................... 439/516; 439/736
(58) Field of Search .............................. 439/516, 736, 439/813, 142, 148, 135–136, 722; 174/68.2, 70 B, 71 B, 72 B, 88 B, 99 B, 129 B, 133 B, 149 B; 361/813

(56) References Cited

U.S. PATENT DOCUMENTS

| 3,989,334 A | * | 11/1976 | Fortino | 439/148 |
| 4,089,041 A | * | 5/1978 | Lockard | 439/516 |
| 4,303,297 A | * | 12/1981 | Smart et al. | 439/688 |
| 6,488,534 B2 | * | 12/2002 | Soga et al. | 439/516 |
| 6,796,852 B2 | * | 9/2004 | Okamoto | 439/736 |

OTHER PUBLICATIONS

Patent Abstract of Japan 2001–179774, published Jul. 3, 2001.
Patent Abstract of Japan 2001–180372, published Jul. 3, 2001.

* cited by examiner

Primary Examiner—Gary Paumen
Assistant Examiner—Felix O. Figueroa
(74) Attorney, Agent, or Firm—Nixon & Vanderhye P.C.

(57) ABSTRACT

A cover for an insulated portion in an automotive room lamp has a base member made of synthetic resin. The base member includes at least one insulation cap integrally formed at the time when the insulation is molded and a bus bar attached to the base member. The bus bar has at least one bridge cut and bent up to separate the bus bar into a plus side section and a minus side section wherein at least one gap is defined therebetween. The at least one insulation cap in the base member is adapted to being brought into engagement with the gap to thereby prevent the plus side section and the minus side section from short-circuiting.

7 Claims, 6 Drawing Sheets

COVERS FOR INSULATED PORTIONS IN AUTOMOTIVE ROOM LAMPS

BACKGROUND OF THE INVENTION

The present invention relates to cover means for insulated portions in an automotive room lamp to be attached to the automobile roof panel made of a metal plate by way of a trim secured to the inner side thereof by fastening by screws, in which the automotive room lamp has plus side and minus side bus bars forming a lighting circuit such that said lighting circuit is not short circuit.

The conventional automotive room lamp is disclosed in Japanese Patent Application No. 2001-179774, in which the invention relates to an automotive lighting system and a method of producing the same. The automotive lighting system disclosed therein is characterized in that a plurality of bus bars having bridge portions are set in an integral form within a injection mold and said bridge portions are cut and bent up to form erect portions for holding the automotive lamp before resin is injected into the mold.

Another type of automotive room lamp is disclosed in Japanese Patent Application No. 2001-180372, in which the automotive room lamp disclosed therein is characterized in being composed of a one piece bus bar having terminals for connecting the switches and the power source therein, a holder to hold the lamp, said one piece bus bar having bridges for connecting lighting circuits; and a synthetic resin base member formed with apertures at positiones corresponding to said bridges in said bus bars set in a positioned manner such that said bridges are cut in said apertures after said bus bars are set in the base member.

It is to be noted in this connection that bridges are cut and bent up to separate the bus bar into the plus line and the minus line and that when the injection molded base member is fastened to the metal roof panel, tapping screws are used to cause metal chips to be produced. Such metal chips can fall onto the cut and bent up portions of bridges to cause short circuiting between the plus line and the minus line with the result that not only lighting of the lamp is impossible but fuse breaking or lamp breakdown takes place.

Further, the latter automotive lamp system has a problem that the holder for connecting the lamp to the bus bar sticks upward from the base member to the roof panel side to cause the holder to press upwardly from the lens side to the roof panel side, then causing short circuiting and fuse breaking because the body side including the roof panel is grounded.

SUMMARY OF THE INVENTION

The present invention is aimed at solving the above identified problem and its object is to provide cover means for an insulated portion in an automotive room lamp characterized in that the cut and bent up portion is to be covered by a cap integrally formed by injection molding, the thus integrally formed cap by injection molding is to cover the top of the plus side lamp holder such that the aperture positioned at the cut off and bent up portion is to be closed, or the top of said lamp holder is to be closed such that the plus side bus bar or holder is prevented from being connected to the minus side.

In order to accomplish the above identified object, the cover means for an insulated portion in an automotive room lamp essentially comprises, in one aspect, a base member made of synthetic resin, said base member having at least one insulation cap integrally formed at the time of insulation molding thereof; and a bus bar attached to said base member, said bus bar having at least one bridge cut and bent up to separate said bus bar into a plus side section and a minus side section, said cut and bent up bridge defining at least one gap therebetween, said at least one insulation cap in the base member being adapted to be brought into engagement with said gap.

It is further desirable that the base member is formed with thin portions across which said at least one cap is folded over to be engaged with said at least one gap.

It is still further desirable that said at least one cap includes a cylindrical pole standing upright from said base member.

It is still further desirable that said cap further includes a cone-shaped portion on top of said cylindrical pole such that said cylindrical pole intervenes between said base member and said cone-shaped portion in the form of a constricted portion.

In another aspect of the invention, the cover means for insulated portion in an automotive room lamp essentially comprises a base member made of synthetic resin, said base member having at least one insulation cap integrally formed at the time of insulation molding thereof; and a bus bar attached to said base member, said bus bar having at least one bridge cut and bent up to separate said bus bar into a plus side section and a minus side section, said cut and bent up bridge defining at least one gap therebetween, said base member having at least one small aperture at a position corresponding to said at least one bridge of said bus bar said at least one insulation cap in the base member being adapted to be brought into engagement with said at least one small aperture, said at least one cap having a shape complimentary to said aperture.

It is desirable that said aperture is of a circular shape while said cap is of a disk shape.

It is further desirable that said cap is connected to said base member by way of said thin portion and folded over across said thin portion to be brought into engagement with said aperture.

In a further aspect of the invention, the covering means for insulated portion in an automotive room lamp comprises a base member made of synthetic resin, a holder for holding a plus side lamp terminal integrally formed in said bus bar accessibly from outside; and a cap integrally formed in said base member at the time of injection molding to cover said holder.

It is desirable that said base member is formed with at least one thin portion which said cap is folded over across said thin portion to cover said holder.

It is further desirable that said cap is integrally formed with a lock mechanism composed of a lock piece and a lock, said lock piece being integrally formed in said base member.

BRIEF DESCRIPTION OF THE DRAWINGS

FIG. 3(a) shows in cross section a bridge portion of the bus bar before being closed by the cap while FIG. 3(b) shows in cross section said bridge portion being closed by the cap;

FIG. 3(c) is a cross section of the second embodiment in which the top of a bridge portion is shown before being closed by a disk shaped cap while FIG. 3(d) is a cross section of the same in which the top of the bridge portion is closed by the disk shaped cap;

DETAILED EXPLANATION OF EMBODIMENTS

Figure 1:
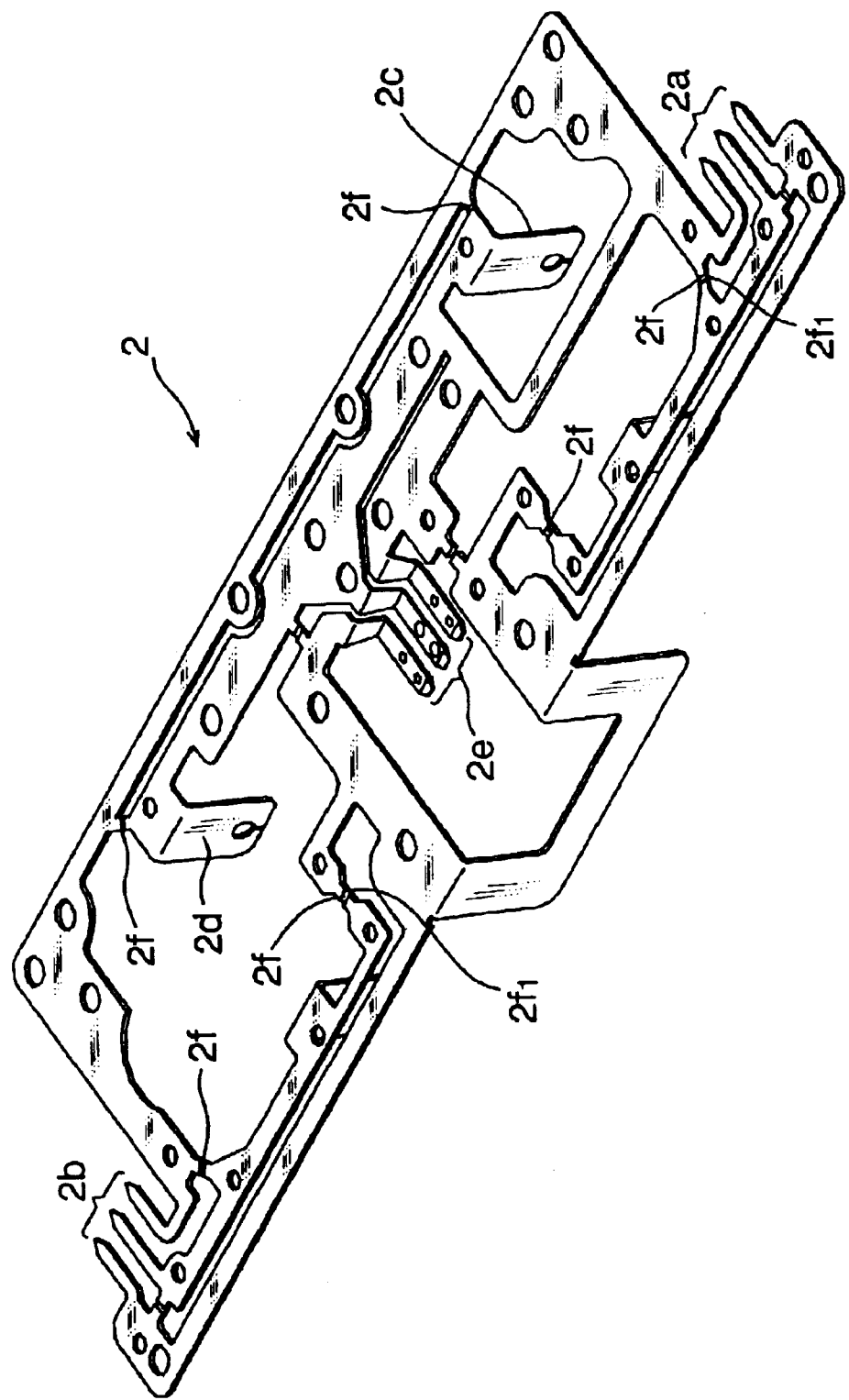
FIG. 1 is a perspective view of the first embodiment of the cover means for insulated portion in an automotive room lamp according to the present invention.
Figure 2:
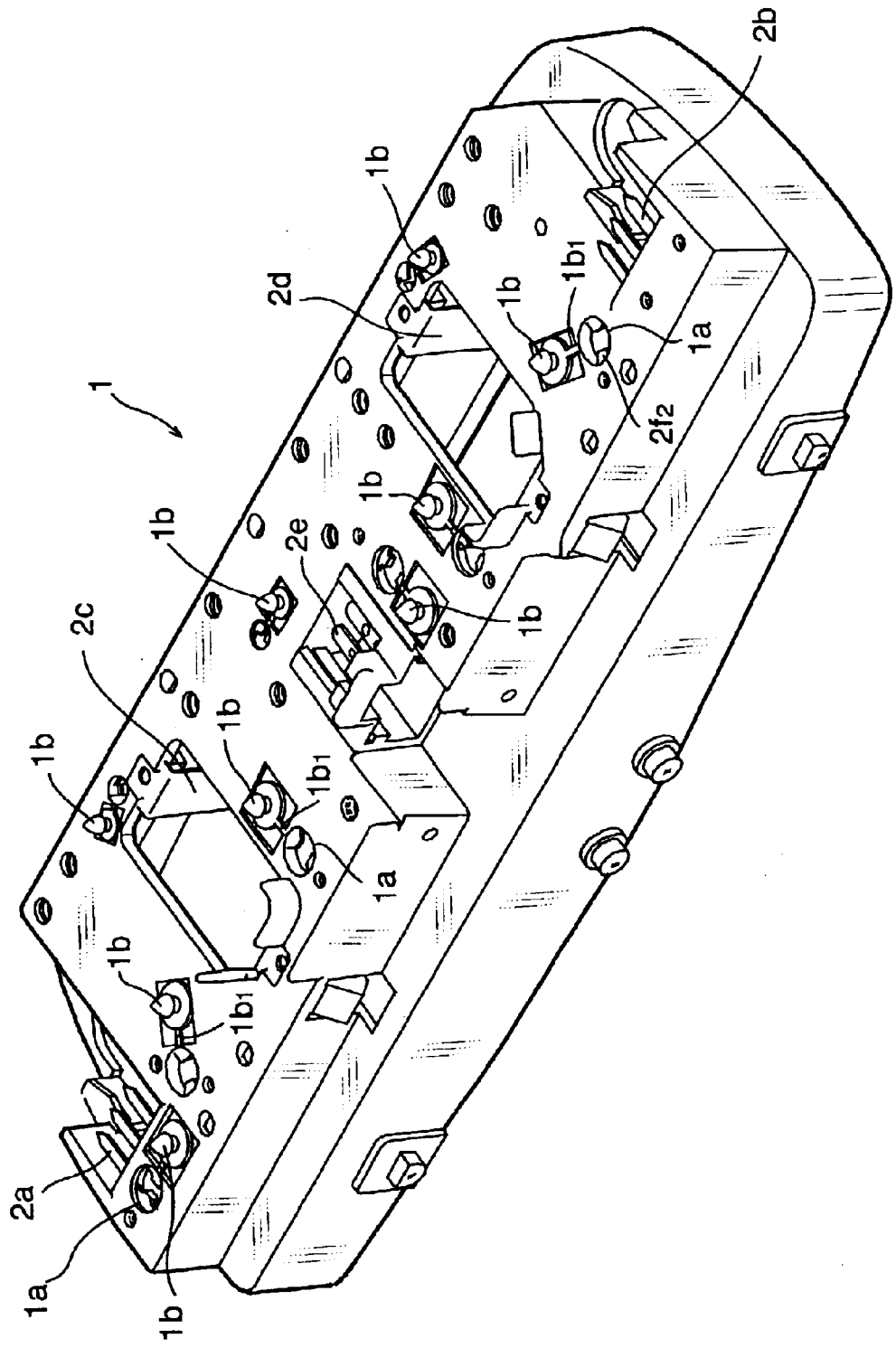
FIG. 2 is a perspective view of a bus bar or a lace curtain embedded by injection molding.
Figure 3:
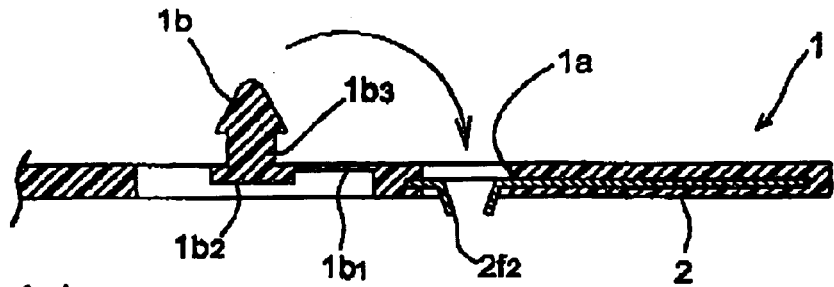
Figure 3:
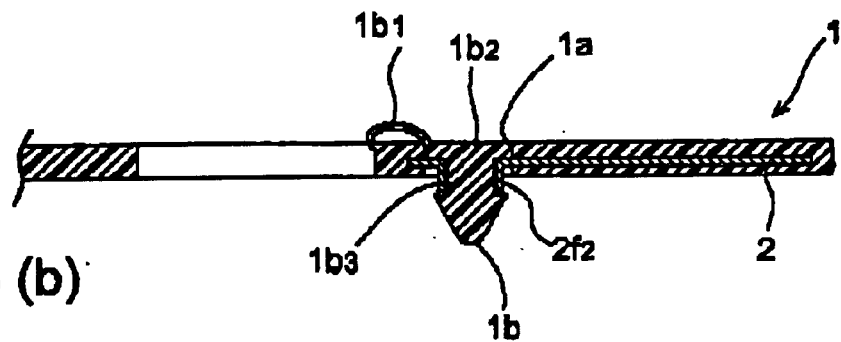
Figure 3:
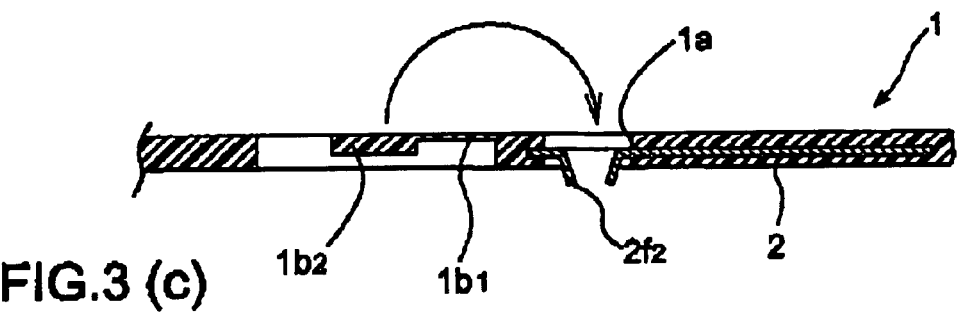
Figure 3:
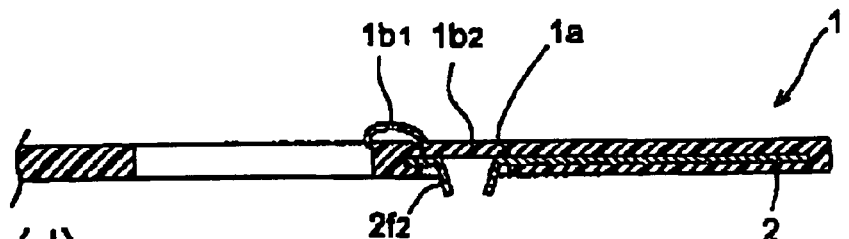

Hereinafter, embodiments of the cover means for insulated portion in automotive room lamps according to the present invention will be explained with reference to the attached drawings.

FIGS. 1 to 3(a) and 3(b) show the first embodiment of the invention, in which the numeral 1 denotes a base member embedded in a molding formed by injection molding as will be explained in detail hereinafter. The numeral 2 denotes an integral bus bar or a lace curtain punched out by press working, said integral bus bar having a plurality of bridges 2f, switch terminal 2a and 2b to be connected to push switches accessible from outside to be turned on and off, erect tabs 2c and 2d to hold a lamp, and terminals 2e to be connected to a power source, door switches or the like.

It is to be noted in this connection that each bridge 2f is made narrow and formed with a groove $2f_1$ in mid portions thereof to have a reduced thickness such that cutting and bending upright the bridge is easily done even with a limited force by means of a jig (see FIG. 1).

Then, said bus bar 2 is embedded in synthetic resin at the time of injection molding by setting or positioning said bus bar 2 within the mold, cutting and bending the bridge up to form a cut-and-bent up portion $2f_2$ by means of a jig, and injecting synthetic resin into the mold to bury the bus bar 2 therein with said base member being formed with small apertures 1a at portions corresponding to said cut-and-bent-up portions $2f_2$. Thus, the bus bar is divided into a plus side bus bar and a minus side bus bar through the small apertures 1a such that a circuit net for lighting the lamp is formed.

Further, upon embedding the bus bar 2 in synthetic resin by injection molding, the base member has a thin portion $1b_1$ and, near each bridge 2f, said base member is formed with a disk $1b_2$ across said thin portion and sized to snugly fit within said small apertures 1a while a cone-shaped cap 1b is integrally formed at said disk $1b_2$ independently therearound, said cone-shaped cap 1b having a constricted portion $1b_3$ which is to be locked with said cut-and-bent-up portion $2f_2$.

It is to be noted in this connection that said base member 1 has a top on which a pair of lenses as disclosed in Japanese Patent Application Laid Open to Public No. 2001-179774 is pivoted such that said lenses are, when pivoted, adapted to actuate push switches connected to the switch terminals 2a and 2b.

In the thus constructed automotive room lamp in the present invention, the second embodiment is shown in FIGS. 3(c) and 3(d) in which said thin portion $1b_1$ is folded over such that the disk $1b_2$ is pressed snugly into the small hole 1a to close the same before said room lamp is fastened to the roof panel by screws. Therefore, even if metal chips produced from the roof panel at the time of fastening said base member 1 to the roof panel by tap screws fall from the roof panel, the cap 1b closes the small hole 1a such that the plus side bus bar and the minus side bus bar are not short circuited.

Figure 4:
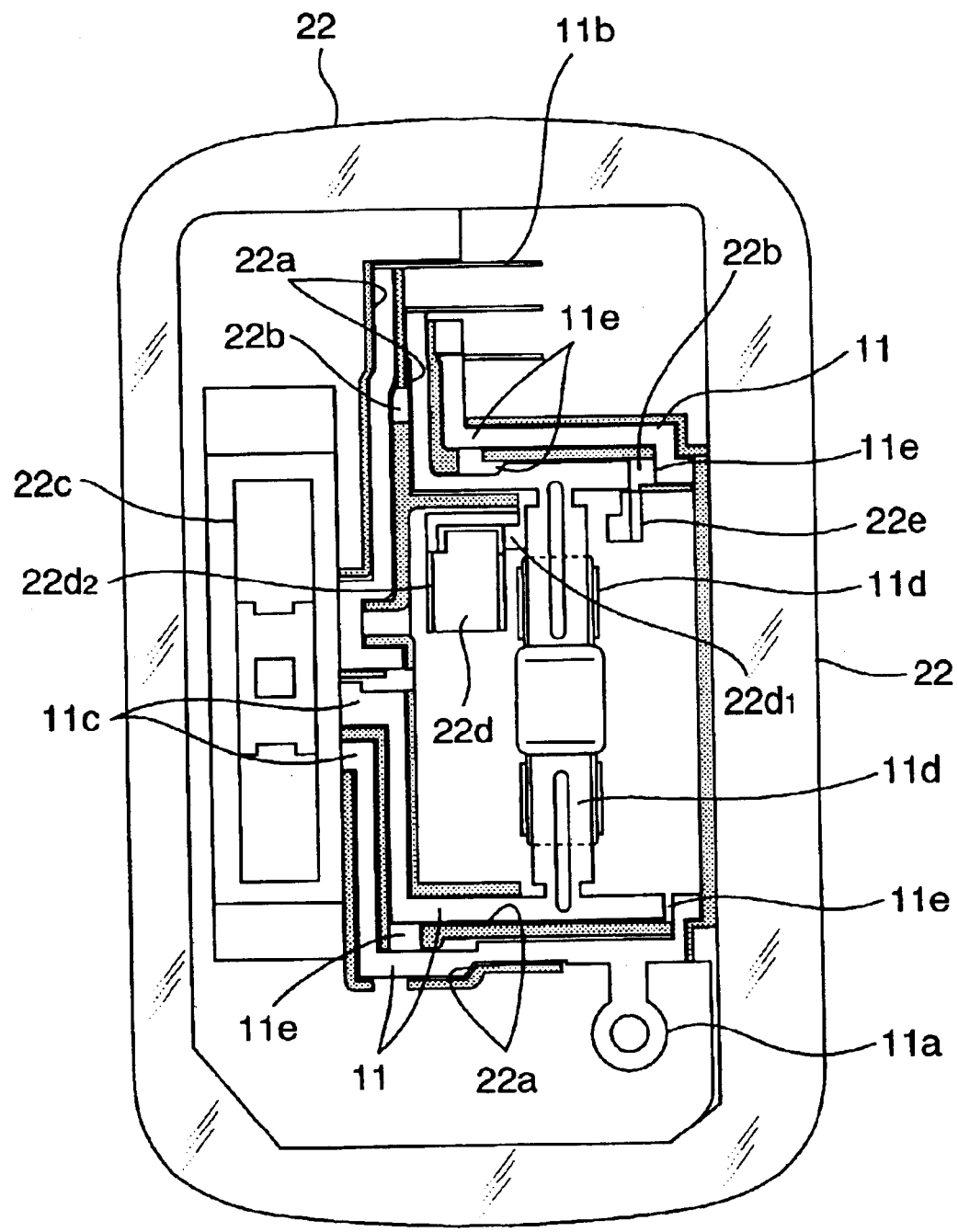
FIG. 4 is a plan view of the second embodiment.
Figure 5:
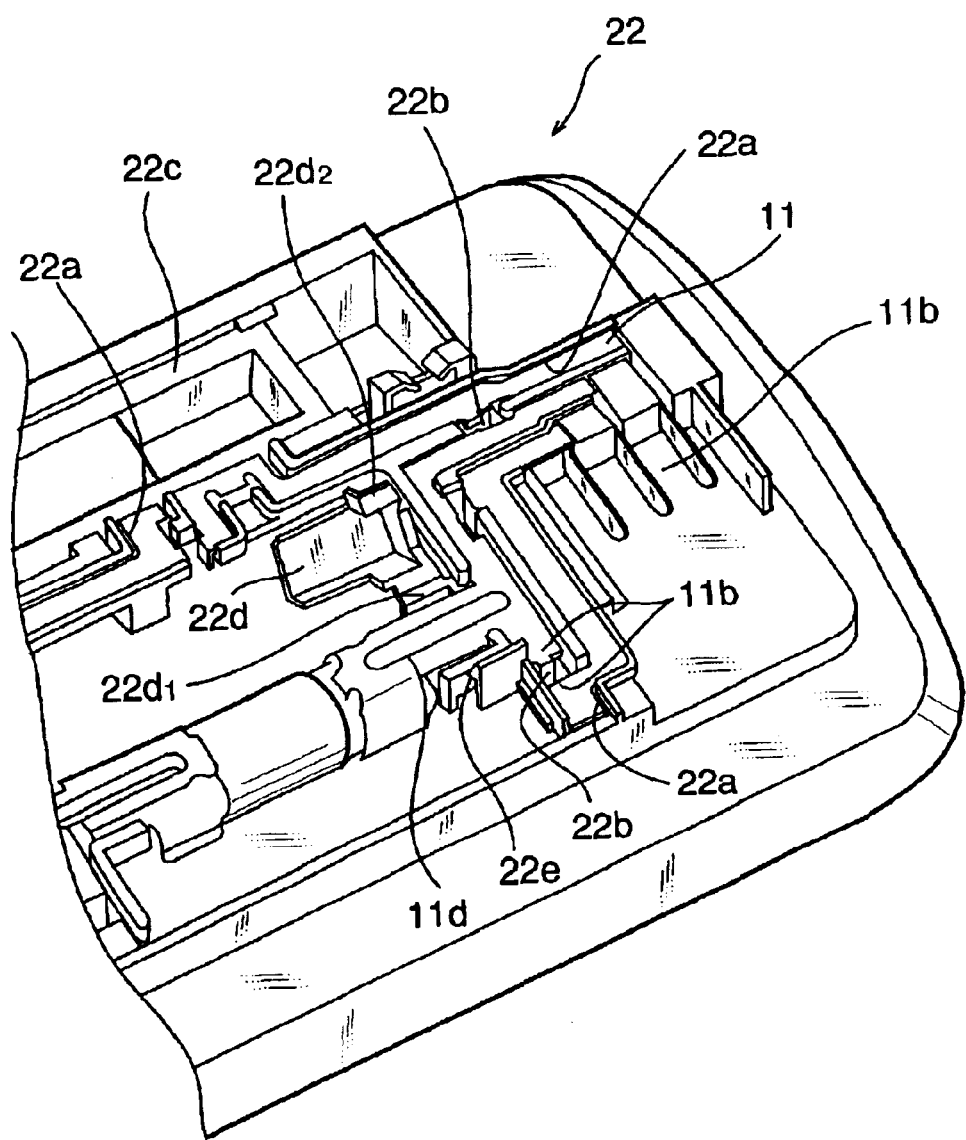
FIG. 5 is a perspective view of the main portion of the room lamp before the holder is covered by the cap.
Figure 6:
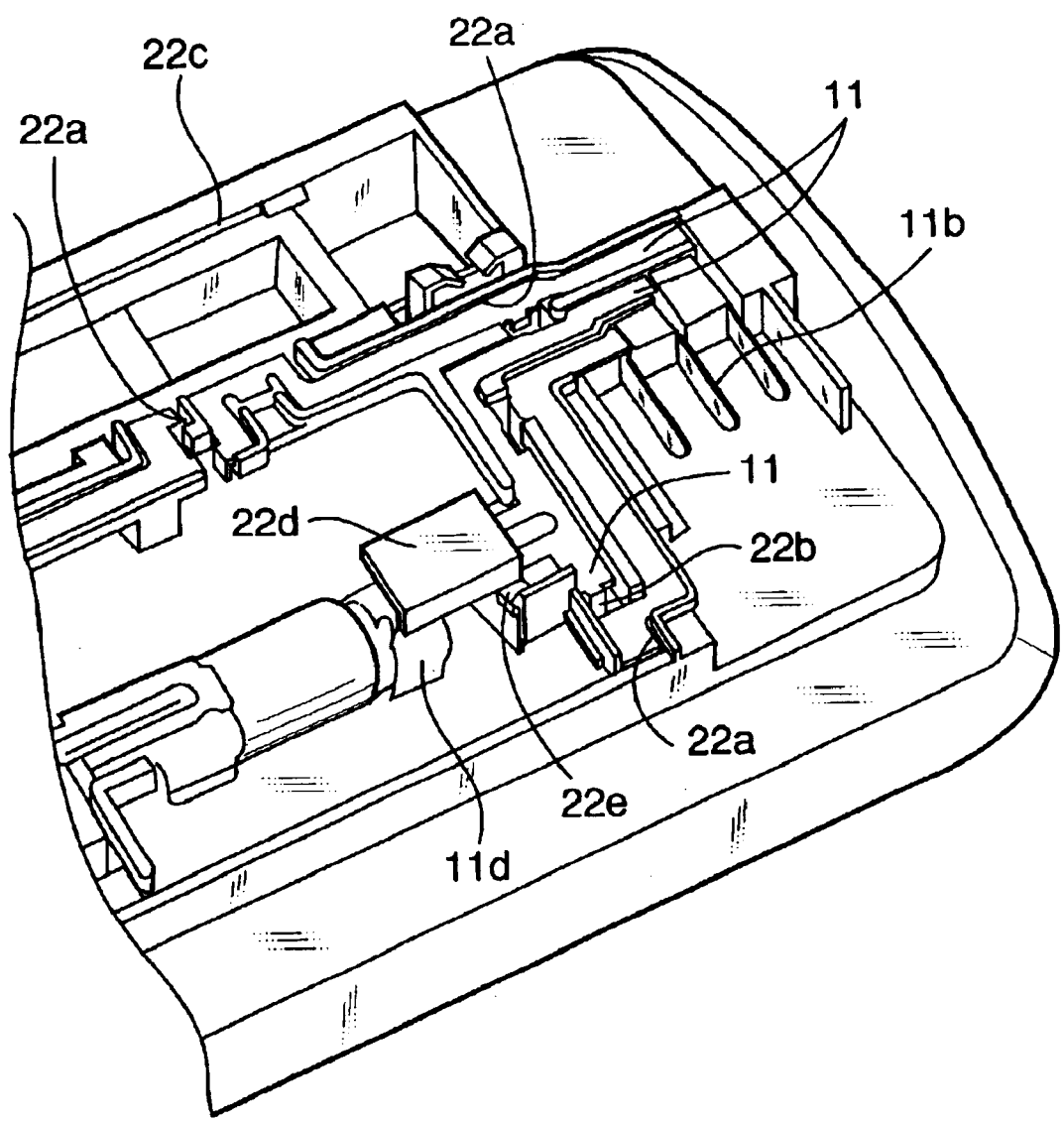
FIG. 6 is a perspective view of the main portion of the room lamp when the holder is covered by the cap.

Next, the third embodiment of the invention will be explained with reference to FIGS. 4 to 6.

In this embodiment, there is provided a bus bar 11 composed of a ground terminal 11a, terminals 11b for connectors connected to a power source (battery) or a door switch, fixed terminals 11c constituting a slide switch and a holder 11d to retain a fuse lamp.

There are provided a plurality of bridges 11e between the respective bus bars 11. For reference, a conventional bus bar assembly is composed of four bus bars but not connected to each other by such bridges 11e as in the present invention. It is to be noted in this connection that each bridge 11e has a constricted portion of a narrow width and is centrally formed with a cut such that a cut-and-bend-up operation is capable at the time of press working.

The numeral 22 denotes a synthetic resin base member formed by injection molding and having grooves 22a therein to receive said bus bars 11. With the bus bars received in said grooves 22a, there are formed a number of small apertures 22b corresponding to the number of said bridges to receive erect portions when cut and bent up, said small apertures 11e being positioned to face said bridges. It is to be noted in this connection that the numeral 22c denotes an accommodation portion to receive a movable contact member which moves on said fixed terminal.

Further, said base member 22 is integrally formed with a cap 22d to cover the top of the holder 11d on the plus side; that is, with a thin portion 22d1 therebetween. A lock $22d_2$ is integrally formed to be engaged with a lock piece 22e on the other side of said holder 11d.

Next, a method of incorporating the bus bar 11 into the base member 22 will be explained.

First, the integral bus bar is fitted into the groove 22a in the base member 22. With this arrangement, the bridges 11e of the bus bar 11 are secured at positions opposite the small apertures 22b in the base member 22.

With said bus bar 11 being incorporated in the base member 22, the bus bar 11 will not constitute a circuit. In the next step said bridges 11e are electrically separated; that is, pins are secured in a press at positions opposite the center of said bridges 11e. Then, said pins are pressed down toward the bridge portion 11e such that the narrow portion centrally formed in the bridge 11e is separated at a cut line to be electrically made independent.

Then, the bus bars are removed from the press to be found forming a circuit with the bridge 11e being separated. Then, a slide switch is incorporated thereinto and connectors are connected to the terminals such that the lamp is ready to be lit.

With the thus constructed automotive room lamp, the base member 22 is attached to the roof panel after the cap 22d is folded over across the thin potion $22d_1$ to cover the top of the plus side holder 11d until the lock piece 22d2 is brought into engagement with the lock piece 22e to secure them. In this way, even if the slide switch is required to be pressed against the roof panel with a risk of the plus side holder 11d being brought into engagement with the roof panel, the resin cap 22d covering the holder 11d prevents the holder 11d from shortcutting by way of the minus side roof.

Further, the base member located close to the small apertures 22b through which the erect portions cut and bent up from the bridges 11e are received may be formed with caps similar to those in the first embodiment though not shown such that said caps are caused to cover and brought into engagement with the small aperture 22b, thus preventing the plus side bus bar and the minus side bus bar from short circuiting because metal chips produced when the base member 22 is attached by fastening to the roof panel with screws.

It is to be noted in this connection that although the cap 1b to cover the small apertures 1a and 22b are provided in the form of cones in the previous embodiment, the shape of the cap 1a is not limited to the cone shape but, for example, a cylindrical pole standing upright from the base member or a disk shaped member 1b to be engage in the small aperture 1a or 22b are acceptable so long as said small apertures 1a or 22b are closed.

In accordance with the present invention, wherein the cap integrally formed in the base member is brought into engagement with the plus side section and the minus side section into which the erect portion for separating the bus bar attached to the resin base member are engaged, there is no likelihood of metal chips produced when tap screws are screwed in for fastening the base member to the roof panel, thus preventing the plus side and the minus side of the bus bar from short circuiting.

Further, since the exposed portion of the lamp retainer on the plus side integrally formed with the bus bar while maintaining an exposed state thereof is made to be covered by a cap integrally formed at the time of molding of the base member, there is an effect that there is no likelihood of a short circuiting of the retainer in contact with the roof panel.

What is claimed is:

1. A cover for an insulated portion in an automotive room lamp, comprising a base member made of a synthetic resin, said base member having at least one insulation cap integrally formed concurrently upon molding thereof; and a bus bar attached to said base member, said bus bar having at least one bridge which is cut and bent up to thereby separate said bus bar into a plus side section and a minus side section, said cut and bent up bridge defining at least one gap between said plus side section and said minus side section, wherein said at least one insulation cap in the base member is adapted to being brought into engagement with said gap to thereby prevent the plus side section and the minus side section from short-circuiting.

2. The cover as set forth in claim 1, wherein said base member is formed with thin portions across which said at least one insulation cap is folded over so as to be engaged with said at least one gap.

3. The cover as set forth in claim 1, wherein said at least one insulation cap includes a cylindrical pole standing upright from said base member.

4. The cover as set forth in claim 3, wherein said at least one insulation cap further includes a cone-shaped portion on top of said cylindrical pole such that said cylindrical pole intervenes between said base member and said cone-shaped portion in the form of a constricted portion.

5. The cover for an insulated portion in an automotive room lamp, comprising a base member made of resin, said base member having at least one insulation cap integrally formed concurrently upon molding thereof; and a bus bar attached to said base member, said bus bar having at least one bridge which is cut and bent up to separate said bus bar into a plus side section and a minus side section, said cut and bent up bridge defining at least one gap between said plus side section and said minus said section, wherein said base member has at least one small aperture at a position corresponding to said at least one bridge of said bus bar, and wherein said at least one insulation cap in the base member is adapted to being brought into engagement with said at least one small aperture to thereby prevent the plus side section and the minus side section from short-circuiting, and wherein said at least one insulation cap is shaped complimentary to said aperture.

6. The cover as set forth in claim 5, wherein said aperture has a circular shape and said at least one insulation cap has a disk shape.

7. The cover as set forth in claim 5, wherein said base member is formed with a this portion, and wherein said at least one insulation cap is connected to said base member by way of said thin portion and folded over across said thin portion so as to be brought into engagement with said aperture.

* * * * *